United States Patent

Ward et al.

[11] Patent Number: 5,554,934
[45] Date of Patent: Sep. 10, 1996

[54] METHOD AND APPARATUS FOR LOCATING A BURIED ELEMENT OF INDUCTIVE MATERIAL USING PROBE WITH DETECTOR COILS

[75] Inventors: Peter Ward, Cramlington; Peter Dowson, Gosforth; John Wilkinson, Sunderland, all of Great Britain

[73] Assignee: British Gas plc, London, England

[21] Appl. No.: 438,927

[22] Filed: May 10, 1995

[30] Foreign Application Priority Data

May 11, 1994 [GB] United Kingdom ............... 9409431

[51] Int. Cl.[6] ............................ G01V 3/11; G01V 3/165
[52] U.S. Cl. ............................... 324/326; 324/345
[58] Field of Search ................................ 324/67, 326, 327, 324/328, 329, 344, 345, 72, 529

[56] References Cited

U.S. PATENT DOCUMENTS

| | | | |
|---|---|---|---|
| 3,889,179 | 6/1975 | Cutler | 324/67 X |
| 3,907,136 | 9/1975 | Christides et al. | |
| 3,988,663 | 10/1976 | Slough et al. | 324/67 X |
| 5,438,265 | 8/1995 | Eslambolchi et al. | 324/326 |

FOREIGN PATENT DOCUMENTS

| | | | |
|---|---|---|---|
| 0045486 | 2/1982 | European Pat. Off. | |
| 2483155 | 11/1981 | France | 324/67 |
| 0066170 | 5/1979 | Japan | 324/326 |
| 0066885 | 4/1983 | Japan | 324/326 |
| 2041531 | 9/1980 | United Kingdom | |
| 2092307A | 8/1982 | United Kingdom | |
| 2204409 | 11/1988 | United Kingdom | |

OTHER PUBLICATIONS

"Solid–State Circuitry Spots Buried Treasure", Product Engineering/Jan. 13, 1969, p. 64.

*Primary Examiner*—Gerard R. Strecker
*Attorney, Agent, or Firm*—Larson & Taylor

[57] ABSTRACT

After having used a known locator and a known transmitter of an electromagnetic field to find the general line of an element such as a pipe 14, the transmitter is kept activated and a probe is used having a linear coil 32 on its tip 30 which lies with its axis parallel to the length of the tip. The probe includes a display and the probe is inserted in the ground and rocked to and fro to determine when the coil is in a minimum current condition. The probe is inserted further and the same procedure repeated. Eventually the probe contacts the pipe and lies in a radial plane with respect to the pipe.

7 Claims, 6 Drawing Sheets

METHOD AND APPARATUS FOR LOCATING A BURIED ELEMENT OF INDUCTIVE MATERIAL USING PROBE WITH DETECTOR COILS

The invention relates to methods and apparatus for use in locating a buried pipe, duct or cable, hereinafter called "a buried element".

The invention is particularly, though not exclusively, of use for accurately locating position and depth of a buried element, for the purpose of drilling the element for access or repair with minimum disturbance of a road or footway. Alternatively, the invention may, for example, be used where it is required to install a new pipe by a trenchless method involving a guided drilling machine. Before guided drilling commences the proposed route must be checked for the presence of existing pipes.

According to the invention, a method of locating a buried element comprises using a transmitter of an alternating magnetic field which by induction causes an alternating current to flow in the buried element and this causes an alternating magnetic field to be radiated from the buried element, and also using an insertable probe having a tip containing a linear coil and having a longitudinal axis and a tip, said probe having a visual display or sound emitter means by which an audio indication can be given, and having signal processing components in an electric circuit, said circuit including said display or audio indication means, said linear coil and a battery, said circuit being arranged to give indications relevant to the position of said linear coil in relation to said alternating magnetic field, said method comprising inserting said tip of said probe into the ground and bringing said tip into contact with said buried element by manipulation of the probe, while said indications are responded to, said linear coil carrying a detected current which is induced in said linear coil by said alternating magnetic field radiated from said buried element and which alternates at the same frequency as said alternating magnetic field, the amplitude of said detected current varying according to the position of said linear coil with respect to said alternating magnetic field but always increasing as said linear coil approaches said buried element, the amplitude being at a minimum when said linear coil is at right angles to said field.

According to the invention, apparatus for performing the method comprises a probe having a longitudinal axis and a tip and a transmitter of an alternating electromagnetic field, said probe comprising a probe rod which is insertable in the ground and which contains a linear coil or coils and said probe also comprising a head from which said probe rod extends said head having amplifying, filtering rectifying and smoothing element for example connected to said coil or coils and providing visual or audio indications relevant to the position of said linear coil or coils in relation to an alternating magnetic field radiation from the buried element.

Embodiments of methods and apparatus will now be described by way of example with reference to the accompanying drawings in which.

Figure 1:
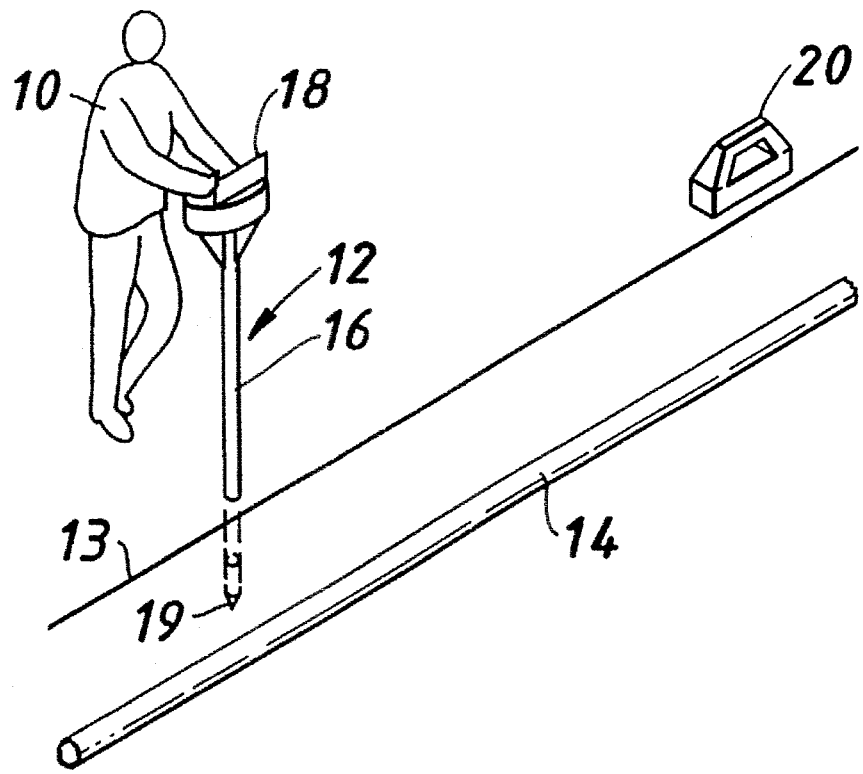
FIG. 1 shows an operator above ground using the apparatus for locating a buried pipe.

FIG. 1 shows an operator 10 wielding a probe 12 made according to the invention to locate a buried element, for example a buried pipe 14 lying beneath the surface 13 of the ground, for example a gas pipe. The probe 12 comprises a relatively stiff rod 16 which is of small diameter, say 10 to 50 millimetres (0.4 to 2 inches). The rod 16 extends downwardly from the probe head 18 which has a display visible to the operator 10. The display is in the form of a meter having a pointer which can move right or left. The probe 12 has a tip 19.

Figure 2:
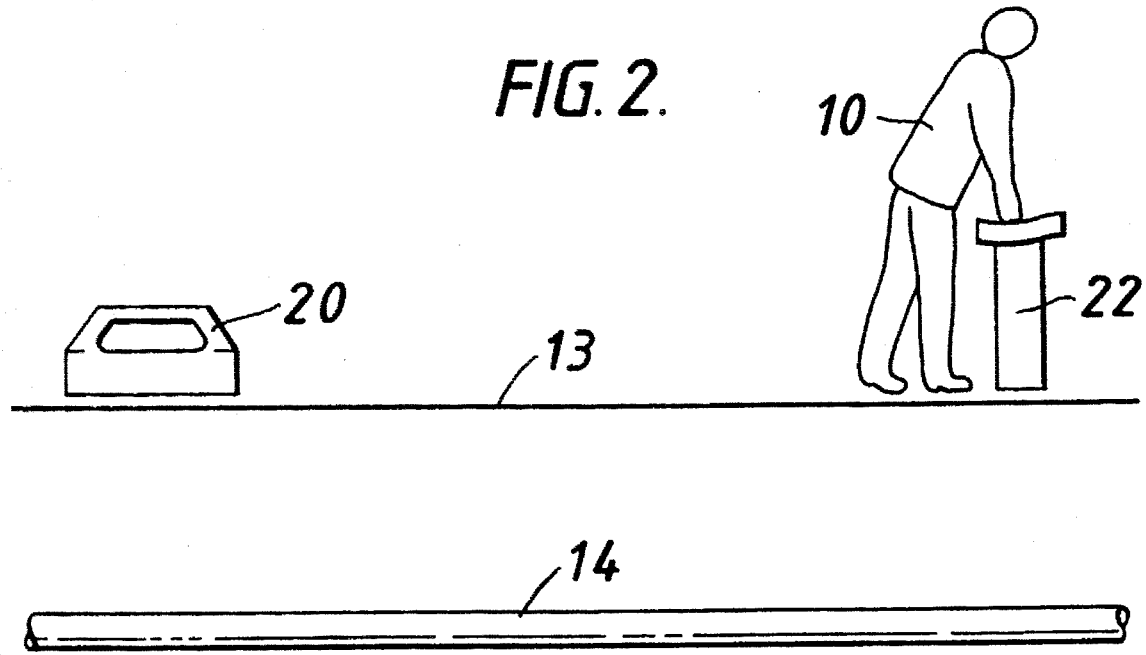
FIG. 2 shows an operator using known apparatus as a preliminary method to obtain an idea of the direction in which the pipe extends.

Before the apparatus shown in FIG. 1 is used, the operator 10 places a known form of transmitter 20 upon the surface of the ground and manipulates a known form of locator 22 in order to obtain an indication of the direction in which the pipe 14 extends. This operation is shown in FIG. 2. The transmitter 20 radiates an alternating magnetic field which induces an alternating current in the pipe 14 and the locator 22 is an electromagnetic apparatus which senses the alternating magnetic field radiated by the pipe 14.

Figure 3:
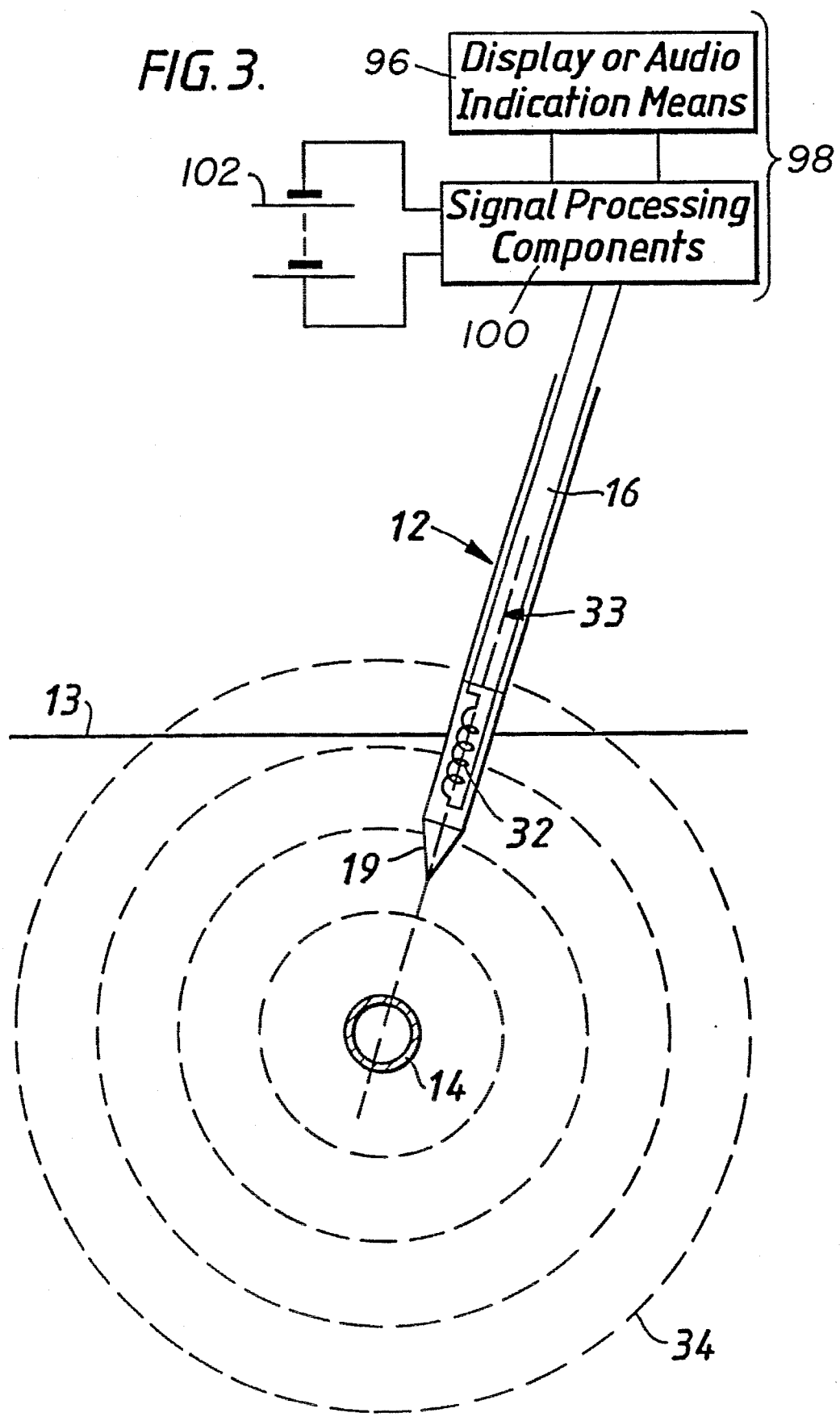
FIG. 3 shows part of the apparatus shown in FIG. 1 in more detail.

Once the line of the pipe 14 has been established, the operator 10 uses the apparatus shown in FIG. 1, together with the transmitter 20 which is left in position and which continues to radiate an alternating magnetic field. The operator 10 inserts the rod 16 into the ground. The tip 19 of the rod 16 is shown in FIG. 3 and contains a linear detection coil 32 which lies with its principal axis extending parallel to the longitudinal axis 33 of the rod 16.

The current which is induced in the pipe 14 causes an alternating magnetic field to be radiated by the pipe 14. The magnetic field lines are circular and are centred on the centre line of the pipe 14 as shown at 34 in FIG. 3. If the tip 19 of the probe approaches the pipe 14 along a radius, the axis of the coil 32 will lie perpendicular to the lines of magnetic flux and thus the signal picked up by the coil 32 and displayed to the operator 10 on the display of the probe 12 will be a minimum.

In order to check whether the signal really is a minimum, the operator 10 manipulates the probe 12. Preferably he rocks the probe 12 backwards and forwards. As the angle made by the coil 32 with the lines 34 increases, the signal on the display changes to give an indication of the amplitude of the signal induced in the coil 32. By rocking the probe 12 backwards and forwards and observing the changing signal on the display it is possible to detect the minimum and align the axis of the probe to be perpendicular to the radiated magnetic lines of flux.

By repeatedly checking the displayed signal as the probe 12 is advanced endwise towards the pipe 14 the operator is provided with an indication of whether the position of the probe should be varied, and in what way, so that the operator can cause the probe 12 to "home in" and eventually cause the tip 19 to contact the pipe 14.

Figure 4:
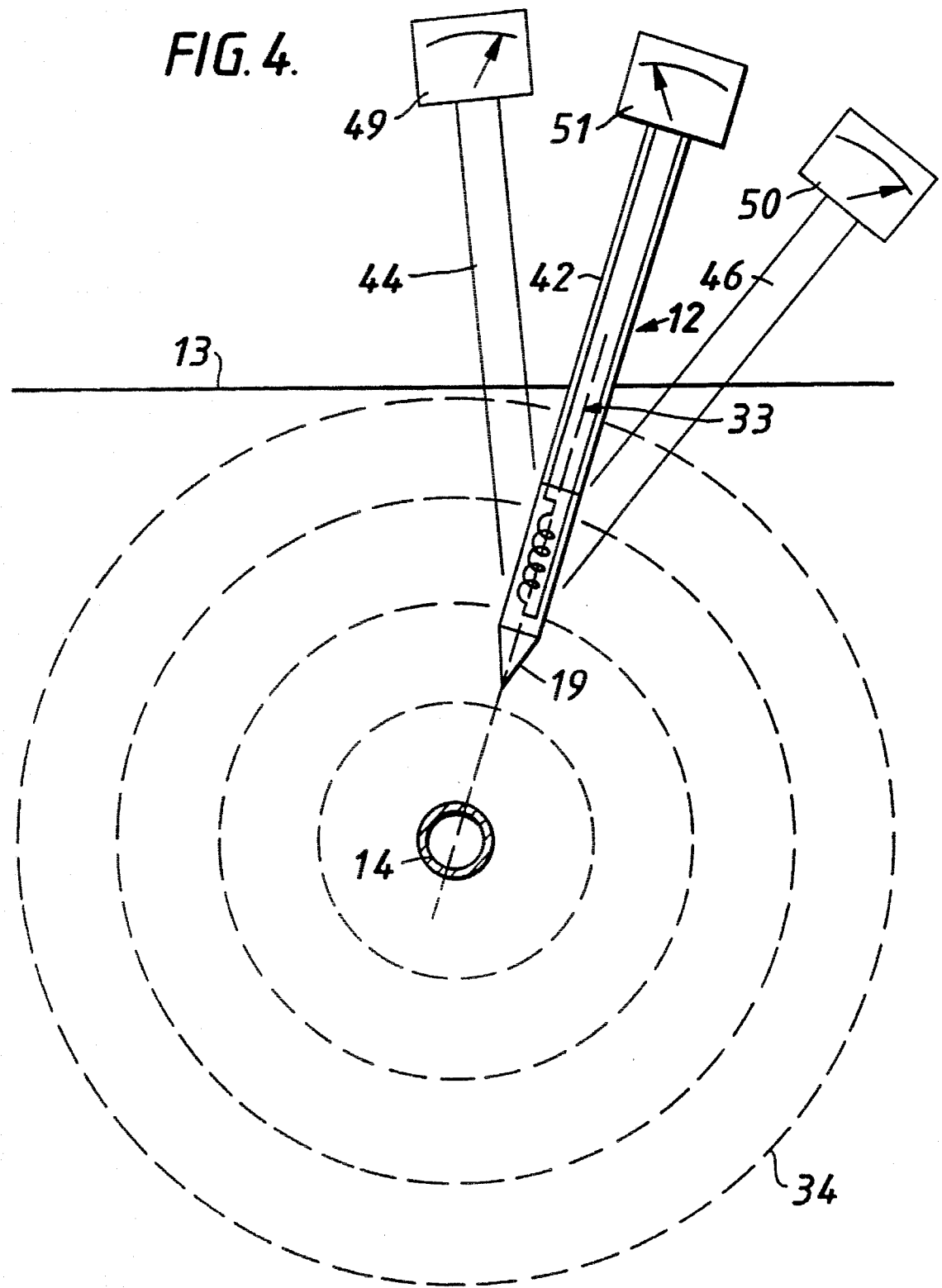
FIG. 4 shows different positions in relation to the pipe and meter readings corresponding to those positions.

FIG. 4 shows positions of the probe 12 in relation to the pipe 14 and shows the corresponding signals displayed on the meter of the display. Position 42 is the position in which the axis of the coil 32 lies on a radius to the pipe 14. If the probe 12 is rocked between the positions 44 and 46, the display meter in the head 18 shows corresponding readings as indicated at 49 and 50. The minimum position, corresponding to the position 42 is indicated at 51.

If the orientation of the probe 12 lies on a radius to the pipe 14, as in 42, the output of the coil 32 as represented on the display at 18 is a minimum as shown in 51.

If the orientation of the probe 12 is moved leftwards to position 44, then the signal from the coil 32 will increase and the pointer of the display will move to the right, 49.

If the orientation of the probe 12 is then moved back through the position 42 at which a minimum 51 is shown on the display, and then moved to the position 46, the needle will move leftwards from the position 49 to reach a minimum at 51 at probe position 42 and then move rightwards again to the position 50 when the probe reaches the position 46.

It will be understood that the minimum signal referred to above is in relation to signals produced when the probe is rocked to displace the tip from a position lying along a radius to the buried pipe to positions on either side of that position. As the probe approaches the pipe 14, the minimum signal indication on the display will increase, though it will still be a minimum signal compared to signals corresponding to probe positions to either side.

In a real environment, the actual field lines radiated by the pipe will be distorted by fields radiated from other plant. When launching the probe 12 from the surface 13, the detector will respond to these other fields as well as the field from the pipe 14. If the probe is moved to obtain a minimum indication, then the axis of the probe 12 will point in the general direction of the pipe 14 but with an error which depends on the degree of distortion of the field. If the probe is now advanced into the ground in the general direction indicated by the minimum display, the probe will get closer to the pipe 14. The magnetic field from the pipe 14 will predominate over the interfering fields from the other plant as the probe 12 gets closer to the pipe 14. Consequently, as the probe approaches the pipe 14 the homing accuracy will increase until the probe 12 contacts the pipe 14.

Once the pipe has been contacted, then other techniques can be used to establish whether it is a gas pipe or some other item of plant, e.g. a water pipe. If it is not the required pipe then the probe 12 can be withdrawn and used to investigate at another location.

In the display mentioned above, the ac currents flowing in the coil 32 are converted to a dc signal by rectification and smoothing of the waveform. The dc signal is applied to the meter shown in FIG. 4 where the meter deflection is proportional to the magnitude of the detected signal.

In cases where the probe is either deflected from its intended path or where the field distortion at the surface is severe, due to the presence of other plant, the probe may miss the target pipe by such a margin that the minimum indication cannot be detected with the available articulation of the probe. To successfully correct the path of the probe, or alternatively to provide a more accurate surface position from which to repeat the operation, more information will be required on the relative positions of the probe and the target pipe.

By adding a second detector coil to the probe in an orientation which is at right angles to the first coil, it is possible to obtain orientation and phase information which can be displayed to the operator. As with the non-phase referenced system the ac current in the solenoid is rectified and converted to a dc signal for display on a meter. However, with the phase referenced system a centre meter can be used and the direction of movement of the meter indicates the direction of the pipe with respect to the probe.

Figure 5:
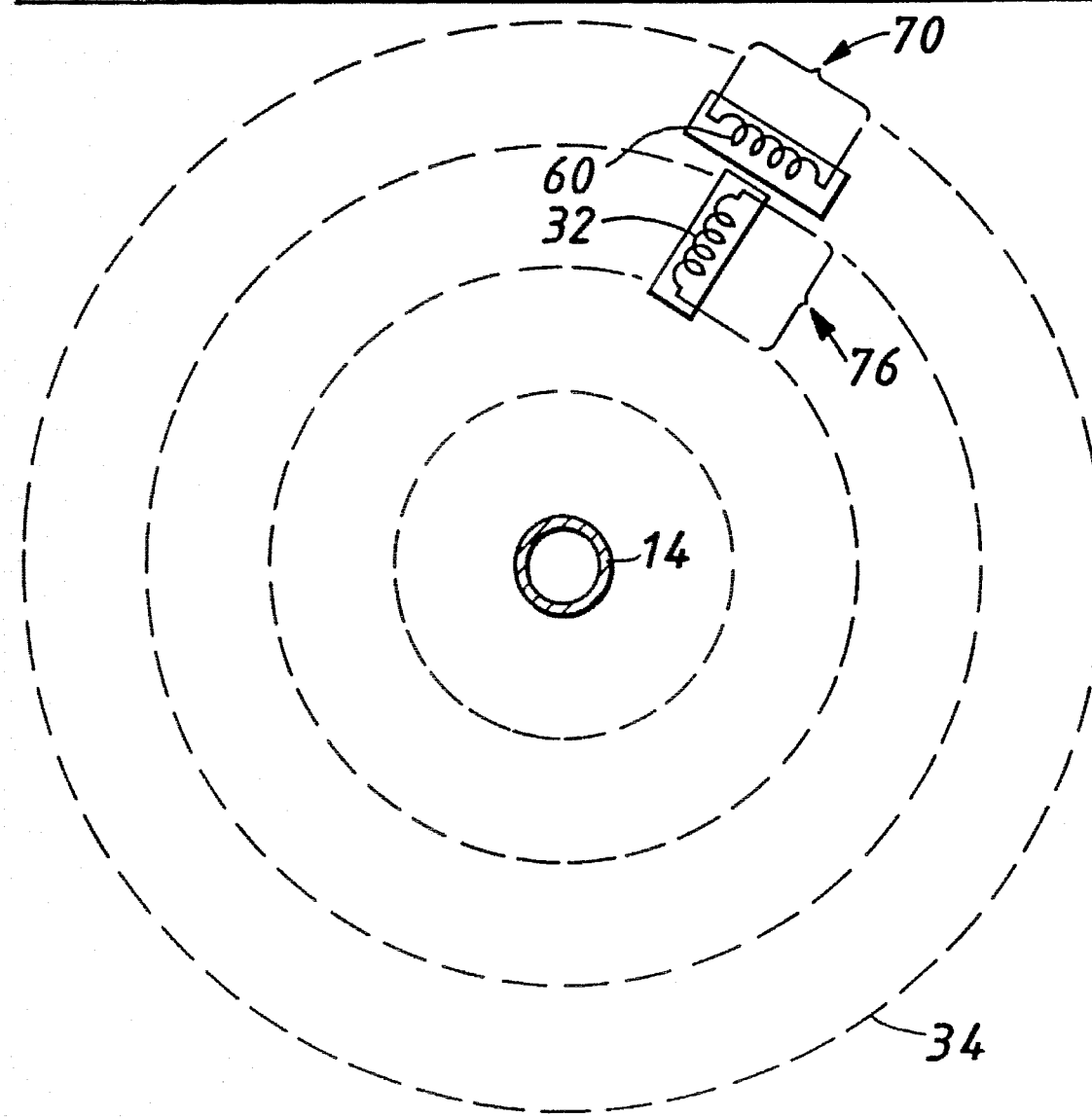
FIG. 5 shows some details of a modified apparatus.

FIG. 5 shows such a modified probe. The original coil 32 is shown. The second coil is shown at 60.

The output from coil 60 is used as a phase reference and the output from coil 32 is compared with that output to determine the direction of the probe with respect to the pipe radius.

Figure 6B:
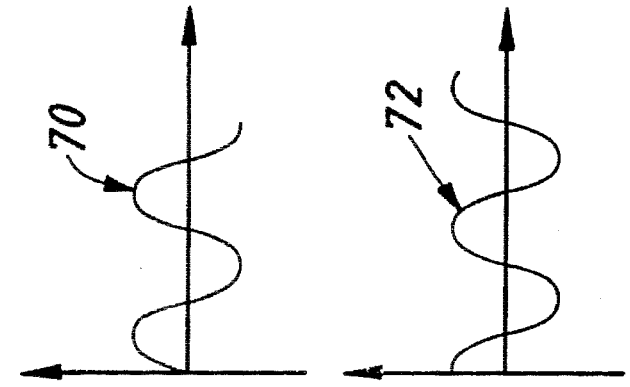

If the orientation of the probe is such that it is pointing to the right of the pipe (as indicated by the uppermost position of the coils 32 and 60 in FIG. 5) the output 72 of the coil 32 and the output 70 of the coil 60 are as shown in FIG. 6. In FIG. 6 the amplitude of the output, in each case, is plotted as ordinate and time is plotted as abscissa. In FIG. 6, the unrectified waveforms are shown from which it can be seen that the two outputs are 90° out of phase with the output 72 leading the output 70.

Figure 7B:
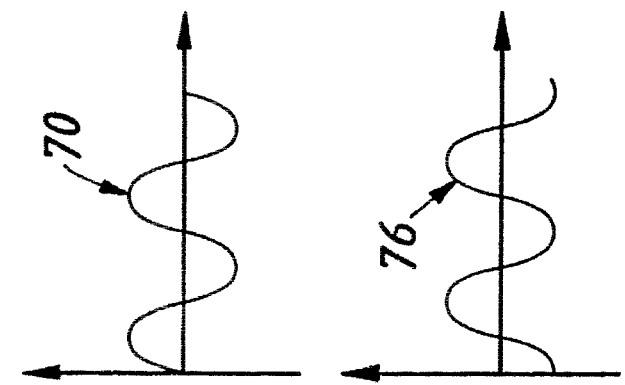
FIGS. 6 and 7 show outputs from coils of the apparatus shown in FIG. 5.

If the probe is now moved so that it points to the left of the pipe (as shown in the lowermost position of the coils 32 and 60 in FIG. 5) then the output 76 of the coil 32 will pass through a minimum and then increase again in amplitude. However, the phase of the output 76 will have changed with respect to the output 70, the output 76 now lagging by 90°. This is shown in FIG. 7.

If the output from the coil 32 is not zero and the output from the coil 32 is leading that from the coil 60 by 90° then the operator 10 must swing the probe 12 to the left as seen in FIG. 5. If on the other hand the output of the coil 32 is lagging that from the coil 60 by 90°, then the operator must swing the probe to the right, in order to obtain a radial position of the probe with regard to the pipe 14.

A further possibility of obtaining a phase reference, using only a single coil 32 in the probe 12 would be to obtain a signal from the output of the transmitter 20, either by direct connection or by radio transmission. Providing the operator 10 always adopts the same orientation with respect to the transmitter, then the phase information will indicate the direction in which the probe must be moved to achieve a null display.

Figure 8:
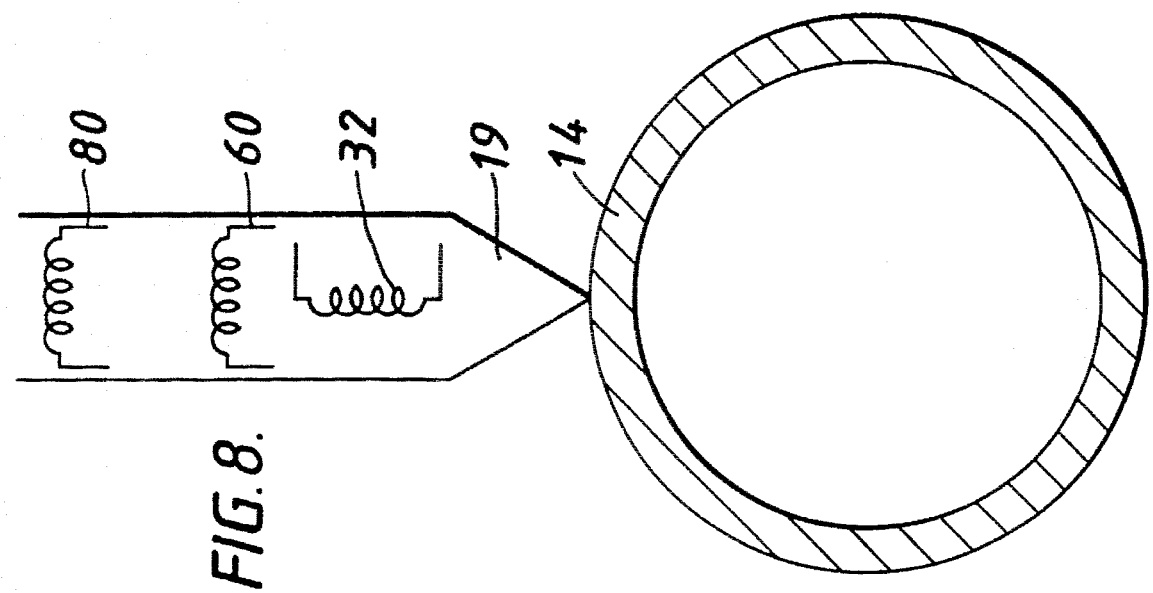
FIG. 8 shows some details of a second form of modified apparatus.

FIG. 8 shows a further modification in which three coils are used in the probe 12. The coils 32 and 60 are shown together with a third coil 80 parallel to the coil 60. A probe in this form can be used when it is in contact with the pipe 14 and when it is in a radial position with respect to the pipe 14.

The coil 60 will be a known distance from the surface of the pipe 14. The third coil 80 is also at a known distance from the surface of the pipe. The field gradient can be calculated and the distance of the coil 60 from the centre of the pipe can also be calculated. Then, knowing the distances of the coil 60 from the surface of the pipe and from the centre of the pipe, the radius of the pipe can be deduced.

Although a visual display has been described above, it may in a modification be replaced by means, including a sound emitter means, by which an audio indication can be given. In both versions of the probe it will be understood that the display or audio indication means 96 is included in a circuit 98 (FIG. 3), included in the probe, which circuit 98 also includes the linear coil 32, signal processing components 100 such as amplifying filtering and rectifying and smoothing elements, for example, and a battery 102 arranged to give indications relevant to the position of the linear coil in relation to the alternating magnetic field radiated from the pipe 14.

Figure 9:
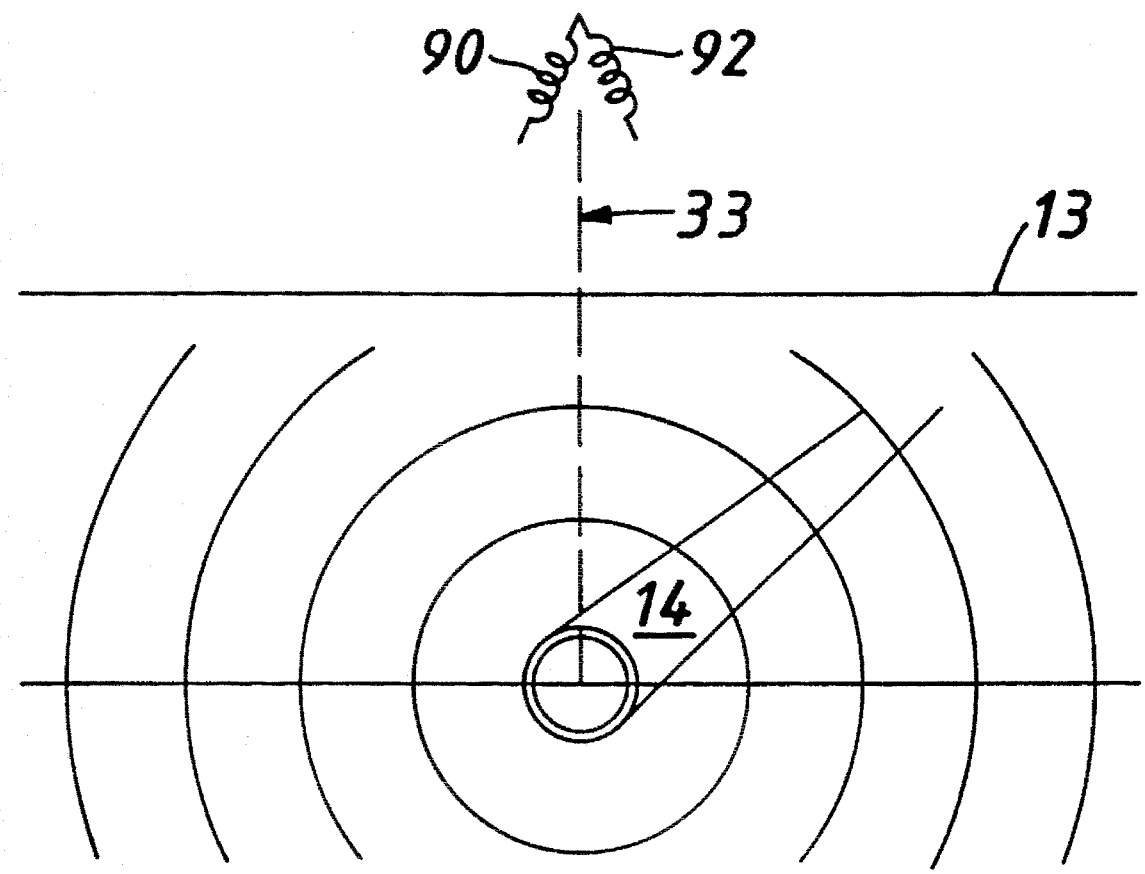
FIG. 9 shows yet another form of the method and apparatus.

FIG. 9 shows yet another embodiment of the method and apparatus.

In this embodiment the probe has two linear coils 90 and 92 which are equidistant from the tip 19 and the coils 90 and 92 are equally and oppositely inclined to the longitudinal axis 33 of the probe 12. The preferred inclination is 30° for each coil. In an alternative embodiment (not shown) the coils can be inclined to the longitudinal axis 33 so as to present an upright V shape instead of the inverted V shape as shown in FIG. 9.

When the probe 12 points directly at the pipe 14 or other buried element the signal amplitude in each coil is the same and the difference between them is zero.

In any other position of the probe the signal amplitudes from the coils 90, 92 are not the same and the difference between the two amplitudes is not zero.

By using a meter (not shown) which is designed to read zero at the centre of its scale it is relatively easy to cause the probe to home in on the buried element. The advantage of this embodiment is that electronically it is much easier to detect a true zero in the difference of the amplitude signals than trying to detect a null or minimum condition as in the embodiment of FIG. 3, for example.

We claim:

1. A method of locating a buried element of inductive material comprising using a transmitter of an alternating magnetic field which, by induction, causes an alternating current to flow in the buried element so as to cause an alternating magnetic field to be radiated from the buried element, and further using an insertable probe containing a first linear coil for detecting said radiated field, said probe having a longitudinal axis and a tip, and including indicator means comprising a visual display or sound emitter means for producing an audio indication, and an electrical circuit, including said indicator means, said first linear coil, signal processing components, and a battery, for producing indications relevant to the position of said first linear coil in relation to said alternating magnetic field, said method including inserting said tip of said probe into the ground and bringing said tip into contact with said buried element by manipulation of the probe including pivoting of said longitudinal axis of said probe about said tip in response to said indications, said first linear coil carrying a detected current which is induced in said first linear coil by said alternating magnetic field radiated from said buried element and which alternates at the same frequency as said alternating magnetic field, the amplitude of said detected current varying according to the position of said first linear coil with respect to said alternating magnetic field and increasing as said first linear coil approaches said buried element, said amplitude being at a minimum when said first linear coil is at right angles to said magnetic field, said first linear coil having a longitudinal axis parallel to the longitudinal axis of the probe and said probe containing a second linear coil at right angles to said first linear coil for, in cooperation with said first linear coil, producing orientation and phase information to said indicator means so as to enable an operator of said probe to direct said probe towards said buried element by steering said probe based on said information.

2. A method according to claim 1, in which said probe contains a third linear coil disposed parallel to said second coil and located at a distance from the tip of the probe different than the known distance between said second coil and the tip of the probe so that a field gradient can be measured when the probe is in contact with said buried element, said method further comprising calculating from the field gradient the distance of the second coil from the center of said buried element, and calculating the radius of said buried element from the difference between the distance of the second coil from the center of said buried element and said known distance of the second coil from the tip of the probe, when the tip of the probe is in contact with said buried element.

3. A method of locating a buried element of inductive material comprising using a transmitter of an alternating magnetic field which, by induction, causes an alternating current to flow in the buried element so as to cause an alternating magnetic field to be radiated from the buried element, and further using an insertable probe containing a first and second linear coils for detecting said radiated field, said probe having a longitudinal axis and a tip, and including indicator means comprising a visual display or sound emitter means for producing an audio indication, and an electrical circuit, including said indicator means, said first and second linear coils, signal processing components and a battery, for producing indications relevant to the position of said first and second linear coils in relation to said alternating magnetic field, said method including inserting said tip of said probe into the ground and bringing said tip into contact with said buried element by manipulation of the probe including pivoting of the longitudinal said probe about said tip in response to said indications, each said linear coil carrying a detected current which is induced in the coil by said alternating magnetic field radiated from said buried element and which alternates at the same frequency as said alternating magnetic field, the amplitude of said detected current varying according to the position of said linear coils with respect to said alternating magnetic field and increasing as said linear coils approach said buried element, said first and second linear coils being equidistant from said tip and said first and second linear coils being equally and oppositely inclined to said longitudinal axis so that when the probe is pointing directly at the buried element the signals from said linear coils are of equal amplitude, and so that in any other position of the probe the signals from the first and second linear coils are of different amplitudes.

4. An arrangement for locating a buried element of inductive material, said arrangement comprising a transmitter of an alternating magnetic field for causing, by induction, an alternating current to flow in the buried element so as to cause an alternating magnetic field to be radiated from the buried element, and an insertable probe containing a first linear coil for detecting said radiated field, said probe having a longitudinal axis and including a probe rod having a tip and a probe head connected to said probe rod and including indicator means comprising a visual display or sound emitter means for producing an audio indication, and an electrical circuit, including said indicator means, said first linear coil, signal processing components, and a battery, for producing indications relevant to the position of said first linear coil in relation to said alternating magnetic field, said tip of said probe rod being pointed so as to be insertable into the ground so that said tip can be brought into contact with said buried element by manipulation of the probe rod including pivoting of said probe rod about said tip in response to said indications, said first linear coil carrying a detected current which is induced in said first linear coil by said alternating magnetic field radiated from said buried element and which alternates at the same frequency as said alternating magnetic field, the amplitude of said detected current varying according to the position of said first linear coil with respect to said alternating magnetic field and increasing as said first linear coil approaches said buried element, said amplitude being at a minimum when said first linear coil is at right angles to said magnetic field, said first linear coil having a longitudinal axis parallel to the longitudinal axis of the probe and said probe head containing a second linear coil disposed at right angles to said first linear coil for, in cooperation with said first linear coil, producing orientation and phase information to said indicator means so as to enable an operator of said probe to direct said probe rod towards said buried element by steering said probe based on said information.

5. An arrangement according to claim 4, wherein said probe is coupled to said transmitter, and said transmitter produces a phase reference signal for providing an additional indication.

6. An arrangement according to claim 4, wherein said probe rod head includes a third linear coil disposed parallel to said second coil and located at a different distance from the tip of said probe rod than said second coil, said third coil being connected to said signal processing components so as to enable calculation of the radius of the pipe.

7. An arrangement for locating a buried element of inductive material, said arrangement comprising using a transmitter of an alternating magnetic field for causing, by induction, an alternating current to flow in the buried element so as to cause an alternating magnetic field to be radiated from the buried element, and an insertable probe containing a first and second linear coils for detecting said radiated field, said probe having a longitudinal axis and including a probe rod having a tip and a probe head connected to said probe rod and including indicator means comprising a visual display or sound emitter means for producing an audio indication, and an electrical circuit, including said indicator means, said first and second linear coils, signal processing components and a battery, for producing indications relevant to the position of said first and second linear coils in relation to said alternating magnetic field, said tip of said probe rod being pointed so as to be insertable into the ground so that said tip can be brought into contact with said buried element by manipulation of the probe including pivoting of said probe rod about said tip in response to said indications, each said linear coil carrying a detected current which is induced in the coil by said alternating magnetic field radiated from said buried element and which alternates at the same frequency as said alternating magnetic field, the amplitude of said detected current varying according to the position of said linear coils with respect to said alternating magnetic field and increasing as said linear coils approach said buried element, said first and second linear coils being equidistant from said tip and said first and second linear coils being equally and oppositely inclined to said longitudinal axis so that when the probe is pointing directly at the buried element the signals from said linear coils are of equal amplitude, and so that in any other position of the probe the signals from the first and second linear coils are of different amplitudes.

* * * * *